(12) United States Patent
Kim et al.

(10) Patent No.: US 11,999,872 B2
(45) Date of Patent: Jun. 4, 2024

(54) SEPARATOR FOR LITHIUM-SULFUR BATTERY AND LITHIUM-SULFUR BATTERY INCLUDING SAME

(71) Applicant: LG ENERGY SOLUTION, LTD., Seoul (KR)

(72) Inventors: Kihyun Kim, Daejeon (KR); Seungbo Yang, Daejeon (KR); Jieun Song, Daejeon (KR); Dongseok Shin, Daejeon (KR); Doo Kyung Yang, Daejeon (KR); Soohyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 978 days.

(21) Appl. No.: 16/956,413

(22) PCT Filed: May 8, 2019

(86) PCT No.: PCT/KR2019/005444
§ 371 (c)(1),
(2) Date: Jun. 19, 2020

(87) PCT Pub. No.: WO2019/225884
PCT Pub. Date: Nov. 28, 2019

(65) Prior Publication Data
US 2020/0395586 A1 Dec. 17, 2020

(30) Foreign Application Priority Data
May 24, 2018 (KR) .................. 10-2018-0058853

(51) Int. Cl.
*C09D 7/61* (2018.01)
*C09D 179/02* (2006.01)
(Continued)

(52) U.S. Cl.
CPC ............ *C09D 7/61* (2018.01); *C09D 179/02* (2013.01); *H01M 10/0525* (2013.01);
(Continued)

(58) Field of Classification Search
None
See application file for complete search history.

(56) References Cited

U.S. PATENT DOCUMENTS 11,581,614 B2 * 2/2023 Kim ..................... C09D 201/02
2002/0168569 A1 11/2002 Barriere et al.
(Continued)

FOREIGN PATENT DOCUMENTS

CN 103904278 A 7/2014
CN 104362394 A 2/2015
(Continued)

OTHER PUBLICATIONS

CN 104524990 A (English Language Abstract etc.) (Year: 2015).*
(Continued)

*Primary Examiner* — Joseph D Anthony
(74) *Attorney, Agent, or Firm* — Birch, Stewart, Kolasch & Birch, LLP

(57) ABSTRACT

A separator for a lithium-sulfur battery and a lithium-sulfur battery including the same is provided. More particularly, a separator for a lithium-sulfur battery including a porous substrate; and a coating layer present on at least one surface of the porous substrate, wherein the coating layer includes a polymer and a graphitic carbon-based compound, wherein the polymer includes a main chain with a functional group having a non-covalent electron pair present in the main chain and a side chain with an aromatic hydrocarbon group present in the side chain.

14 Claims, 7 Drawing Sheets

(51) Int. Cl.
*H01M 10/0525* (2010.01)
*H01M 50/446* (2021.01)
*H01M 50/451* (2021.01)
*C08K 3/04* (2006.01)

(52) U.S. Cl.
CPC ....... *H01M 50/446* (2021.01); *H01M 50/451* (2021.01); *C08K 3/04* (2013.01)

(56) References Cited

U.S. PATENT DOCUMENTS

| | | | |
|---|---|---|---|
| 2005/0053839 | A1 | 3/2005 | Ryu et al. |
| 2007/0036959 | A1* | 2/2007 | Yamato ............... H01M 50/414 427/430.1 |
| 2009/0246625 | A1 | 10/2009 | Lu |
| 2012/0164513 | A1 | 6/2012 | Peng et al. |
| 2014/0186724 | A1* | 7/2014 | Hammond ............ H01M 50/46 427/535 |
| 2015/0236324 | A1 | 8/2015 | Xiao et al. |
| 2016/0164103 | A1 | 6/2016 | Son et al. |
| 2016/0233475 | A1 | 8/2016 | Son et al. |
| 2016/0233487 | A1 | 8/2016 | Jun et al. |
| 2018/0198156 | A1 | 7/2018 | Lee et al. |
| 2018/0269453 | A1* | 9/2018 | Cho .................... H01M 50/449 |
| 2019/0267596 | A1* | 8/2019 | Guo ...................... H01M 50/42 |

FOREIGN PATENT DOCUMENTS

| | | |
|---|---|---|
| CN | 105609690 A | 5/2016 |
| CN | 105637677 A | 6/2016 |
| CN | 107068945 A | 8/2017 |
| CN | 107863534 A | 3/2018 |
| EP | 2 897 203 A1 | 7/2015 |
| JP | 2002-334721 A | 11/2002 |
| JP | 2016-532992 A | 10/2016 |
| KR | 10-2013-0139200 A | 12/2013 |
| KR | 10-2016-0037084 A | 4/2016 |
| KR | 10-2016-0046775 A | 4/2016 |
| KR | 10-2018-0037616 A | 4/2018 |
| KR | 10-2017-0032713 A | 3/2017 |
| KR | 10-2017-0090294 A | 8/2017 |
| KR | 10-2017-0108496 A | 9/2017 |
| KR | 10-1795841 B1 | 11/2017 |

OTHER PUBLICATIONS

Enhanced Performance of Lithium Sulfur Battery With a Reduced Graphene Oxide Coating Separator, Journal of the Electrochemical Society 162(8) A1624-A1629. (Year: 2015).*

Jiang et al., "Inhibiting the shuttle effect of Li—S battery with a graphene oxide coating separator: Performance improvement and mechanism study", Journal of Power Sources, vol. 342, 2017, pp. 929-938.

Extended European Search Report for European Application No. 19807623.4, dated Mar. 1, 2021.

Shau et al., "Individual graphene oxide platelets through direct molecular exfoliation with globular amphiphilic hyperbranched polymers", Polymer Chemistry, vol. 3, 2012, pp. 1249-1259.

Abbas et al., "Bifunctional separator as a polysulfide mediator for highly stable Li—S batteries," Journal of Materials Chemistry A, 2016, pp. 1-26.

International Search Report (PCT/ISA/210) issued in PCT/KR2019/005444, dated Sep. 16, 2019.

Liu et al., "Ultrathin dendrimer-graphene oxide composite film for stable cycling lithium-sulfur batteries," PNAS, Apr. 4, 2017, vol. 114, No. 14, pp. 3578-3583.

Xu et al., "Conductive Graphene Oxide-Polyacrylic Acid (GOPAA) Binder for Lithium-Sulfur Battery," Nano Energy, vol. 31, Jan. 2017, pp. 1-18.

Lin et al., "Enhanced Performance of Lithium Sulfur Battery with a Reduced Graphene Oxide Coating Separator", Journal of The Electrochemical Society, vol. 162, 2015, pp. A1624-A1629 (7 pages total).

Dent, "GPC/SEC Practical Tips and Tricks," Agilent Technologies, Oct. 2011, retrieved from the Internet, URL: <https://www.agilent.com/cs/library/slidepresentation/Public/GCC2011-Wksp_GPC_Tips-and-Tricks_Presentation.pdf>.

European Communication pursuant to Article 94(3) EPC for European Application No. 19807623.4, dated Sep. 20, 2023.

Ghosh, "Polymer Science—Fundamentals of Polymer Science—Molecular Weights of Polymers," Polymer Study Centre, Sep. 21, 2006, retrieved from the Internet, URL: <http://nsdl.niscair.res.in/spui/bitstream/123456789/406/2/Molecular%20weights%20of%20polymers.pdf>.

* cited by examiner

SEPARATOR FOR LITHIUM-SULFUR BATTERY AND LITHIUM-SULFUR BATTERY INCLUDING SAME

TECHNICAL FIELD

This application claims the benefit of Korean Patent Application No. 10-2018-0058853 on May 24, 2018 with the Korean Intellectual Property Office, the disclosure of which is herein incorporated by reference in its entirety.

The present invention relates to a separator for a lithium-sulfur battery and a lithium-sulfur battery comprising the same.

BACKGROUND ART

Recently, as the miniaturization and weight reduction including high performance improvement of electronic devices, communication devices, and the like are rapidly progressing and the need for electric vehicles is increasing in relation to the depletion of petroleum resource and environmental problems, there is a growing demand for improvement in the performance and lifetime of secondary batteries used as a power source for these products. Among various secondary batteries, the lithium secondary battery has been attracting attention as a high-performance battery due to its high energy density and high standard electrode potential.

In particular, the lithium-sulfur battery is a secondary battery using a sulfur-based material having a sulfur-sulfur bond (S—S bond) as a positive electrode active material and using lithium metal, carbon-based materials that intercalate/deintercalate lithium ions, silicon or tin forming alloys with lithium or the like as a negative electrode active material. In that case, there is an advantage that sulfur, which is the main material of the positive electrode active material, has a low atomic weight, is very rich in resources and thus easy to supply and receive, and is cheap, non-toxic and environmentally friendly. In addition, theoretical discharging capacity of the lithium-sulfur battery is 1675 mAh/g, and its theoretical energy density is 2,600 Wh/kg. Since the theoretical energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is a battery capable of realizing high capacity, high energy density, and long lifetime among secondary batteries developed so far.

In the case of the lithium-sulfur battery, when discharging it, the reduction reaction in which the sulfur accepts the electrons is proceeded at the positive electrode and the oxidation reaction in which lithium is ionized is proceeded at the negative electrode, respectively. During discharging the lithium-sulfur battery, lithium polysulfides (Li$_2$S$_x$, x=2~8) are produced at the positive electrode, and these lithium polysulfides are dissolved in the electrolyte and are diffused into the negative electrode to not only cause various side reactions but also reduce the capacity of the sulfur participating in the electrochemical reaction. Also, during the charging process, the lithium polysulfide causes a shuttle reaction, thereby significantly lowering the charging/discharging efficiency.

In order to solve the above problems, a method of adding an additive having a property of adsorbing sulfur has been proposed, but this method has caused a deterioration problem and thus newly generated an additional side reaction of the battery. Accordingly, in order to delay leak of the positive electrode active material, i.e., sulfur, a method of adding metal chalcogenide, alumina or the like or coating the surface with oxycarbonate or the like has been proposed. However, in the case of these methods, not only the sulfur is lost during processing or the method is complicated, but also the amount of the active material, i.e., sulfur, that can be put in (i.e., the amount of loading) is limited.

Therefore, various techniques have been proposed to solve the problem of lithium polysulfide in the lithium-sulfur battery.

As an example, Korean Patent Application Publication No. 2016-0046775 discloses that a positive electrode coating layer composed of an amphipathic polymer can be provided on a part of the surface of the positive electrode active part comprising the sulfur-carbon composite to facilitate the migration of lithium ions while inhibiting the leaching of the lithium polysulfide, thereby improving the cycle characteristics of the battery.

In addition, Korean Patent Application Publication No. 2016-0037084 discloses that by coating graphene on a carbon nanotube aggregate containing sulfur, the lithium polysulfide can be prevented from leaching and the electrical conductivity of the sulfur-carbon nanotube composite and the loading amount of sulfur can be increased.

These patents have improved the problem of performance or lifetime degradation of the lithium-sulfur battery to some extent by introducing a coating layer on a positive electrode and thus preventing the outflow of sulfur, but the effect is not enough. In addition, the coating layer itself serving as a protective film acts as a resistance layer, and the path of lithium ions in the electrolyte is lengthened or blocked, so that sufficient performance improvement effect cannot be secured. Therefore, for the commercialization of the lithium-sulfur battery, the problem of the lithium polysulfide is a challenge to be solved foremost.

PRIOR ART DOCUMENT

Patent Document

Korean Patent Application Publication No. 2016-0046775 (Apr. 29, 2016), CATHODE FOR LITHIUM-SULFUR BATTERY AND METHOD OF PREPARING THE SAME.

Korean Patent Application Publication No. 2016-0037084 (Apr. 5, 2016), SULFUR-CARBON NANOTUBE COMPLEX, METHOD OF PREPARING THE SAME, CATHODE ACTIVE MATERIAL FOR LITHIUM-SULFUR BATTERY INCLUDING THE SAME AND LITHIUM-SULFUR BATTERY INCLUDING THE SAME.

DISCLOSURE

Technical Problem

Therefore, the inventors of the present invention have conducted various studies to solve the above problems, and as a result, have identified that by introducing a coating layer comprising a polymer having a specific group and a graphitic carbon-based compound on a separator, the problem of the lithium polysulfide in the lithium-sulfur battery can be solved and the performance of the lithium-sulfur battery can be improved, and thus completed the present invention.

Accordingly, it is an object of the present invention to provide a separator for a lithium-sulfur battery which inhibits the leaching of the lithium polysulfide, thereby improving capacity, charging/discharging efficiency, and lifetime characteristics.

Also, it is another object of the present invention to provide a lithium-sulfur battery comprising the separator described above.

Technical Solution

According to an object of the present invention, the present invention provides a separator for a lithium-sulfur battery comprising a porous substrate and a coating layer formed on at least one surface of the porous substrate, wherein the coating layer comprises a polymer, which includes a functional group having a non-covalent electron pair in its main chain and an aromatic hydrocarbon group in its side chain, and a graphitic carbon-based compound.

According to another object of the present invention, the present invention provides a lithium-sulfur battery comprising the separator for the lithium-sulfur battery as described above.

Advantageous Effects

The separator according to the present invention solves the problem of the lithium polysulfide by forming a coating layer comprising a polymer including a specific group in each of the main chain and the side chain and a graphitic carbon-based compound on the surface thereof.

In the case of the lithium-sulfur battery provided with the separator as described above, since the capacity of sulfur is not lowered, it is possible to realize a high capacity battery, and it is possible to stably apply sulfur with high loading, as well as there is no problem such as a short or heat generation of the battery, and thus the battery stability is improved. In addition, the lithium-sulfur battery has an advantage that the charging/discharging efficiency of the battery is high and the lifetime characteristic is improved.

BEST MODE

Figure 1:
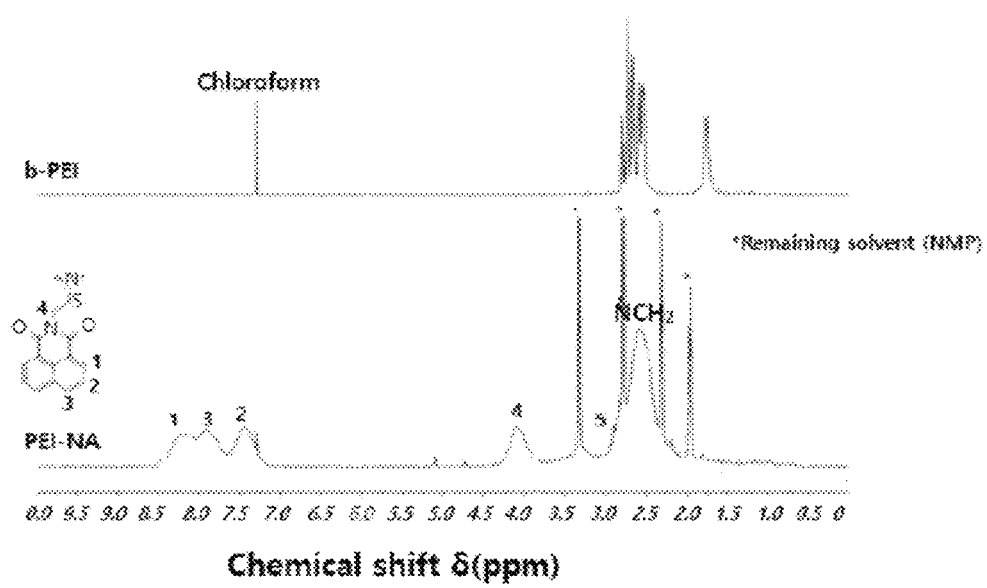
FIG. 1 is a graph showing NMR measurement results according to Experimental Example 1 of the present invention.

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a," "an," and "the" comprise plural referents unless the context clearly dictates otherwise. It is to be understood that the terms such as "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The lithium-sulfur battery has higher discharging capacity and theoretical energy density than other various secondary batteries, and is attracting attention as a next-generation secondary battery due to the advantage that sulfur, which is used as a positive electrode active material, is rich in resources and is cheap and environmentally friendly.

Sulfur, which is used as a positive electrode active material in the lithium-sulfur battery, is converted from the cyclic $S_8$ structure to the linear structures of lithium polysulfides ($Li_2S_x$, x=8, 6, 4, 2) by the reduction reaction and, when the lithium polysulfides are completely reduced, lithium sulfide ($Li_2S$) is finally produced. Among the lithium polysulfides which are the intermediate products of this sulfur reduction reaction, lithium polysulfides ($Li_2S_x$, usually x>4), which has the high oxidation number of sulfur, are substances with a strong polarity, and are easily dissolved in the electrolyte comprising a hydrophilic organic solvent and thus released outside the reaction zone of the positive electrode, thereby no longer participating in the electrochemical reaction and thus resulting in the loss of sulfur.

Despite advantages as described above, since the amount of sulfur involved in the electrochemical reaction is sharply reduced due to this sulfur leaching, the lithium-sulfur battery does not realize all of theoretical capacity and energy density in actual operation. In addition, due to the side reaction of lithium metal used as the negative electrode and lithium polysulfide, there is a problem that the degradation of initial capacity and the cycle characteristics are accelerated after certain cycles.

For this purpose, in the prior art, there has been proposed a method of increasing the content of sulfur in the electrode or introducing an additive or a coating layer capable of inhibiting the leaching of lithium polysulfide. However, there are disadvantages that such a method not only cannot achieve the effect of improving the battery performance to a desired level, but also causes serious problems in the stability of the battery or is inefficient in view of the process.

Therefore, the present invention provides a separator for a lithium-sulfur battery, which has a coating layer comprising a polymer capable of adsorbing lithium polysulfide and a graphitic carbon-based compound, which improves the conductivity and promotes the adsorption effect, in order to suppress the leaching of the lithium polysulfide and to improve the capacity and lifetime characteristics of the lithium-sulfur battery.

Specifically, the separator comprises a porous substrate and a coating layer formed on at least one surface of the porous substrate, wherein the coating layer comprises a polymer, which has a main chain (or backbone) having a functional group including a non-covalent electron pair and has a side chain having an aromatic hydrocarbon group, and a graphitic carbon-based compound.

The porous substrate constituting the separator for the lithium-sulfur battery of the present invention enables the transport of lithium ions between the negative electrode and the positive electrode while separating or insulating the negative electrode and the positive electrode from each other. Therefore, the separator of the present invention may be made of a porous, nonconductive, or insulating material. Also, the separator may be an independent member such as a film.

Specifically, the porous substrate may be a porous polymer film alone or a laminate of porous polymeric films, and for example, may be a non-woven fabric made of glass fiber or polyethyleneterephthalate fiber with high melting point, etc., or a polyolefin-based porous film, but is not limited thereto.

The material of the porous substrate is not particularly limited in the present invention, and any material can be used as long as it is a porous substrate commonly used in an electrochemical device. For example, the porous substrate may comprise at least one selected from the group consisting of polyolefin such as polyethylene and polypropylene, polyester such as polyethyleneterephthalate, polybutyleneterephthalate and polyethylenenaphthalate, polyamide, polyacetal, polycarbonate, polyimide, polyetheretherketone, polyethersulfone, polyphenyleneoxide, polyphenylenesulfide, polytetrafluoroethylene, polyvinylidene fluoride, polyvinyl chloride, polyacrylonitrile, cellulose, nylon, poly(p-phenylene benzobisoxazole, and polyarylate.

The thickness of the porous substrate is not particularly limited, but may be from 1 to 100 μm, preferably from 5 to 50 μm. Although the thickness range of the porous substrate is not particularly limited to the above-mentioned range, when the thickness is excessively thinner than the lower limit described above, mechanical properties are deteriorated and thus the separator may be easily damaged during use of the battery.

The size and porosity of the pores present in the porous substrate are also not particularly limited, but may be from 0.001 μm to 50 μm and from 10 to 95%, respectively.

The coating layer formed on at least one side of the porous substrate plays a role in solving the problems, which is caused by the lithium polysulfide, and for these purposes, comprises a polymer which has a main chain having a functional group including a non-covalent electron pair and side chains having an aromatic hydrocarbon group.

The functional group including the non-covalent electron pair which is comprised in the main chain of the polymer is applied to the separator as a coating layer to adsorb the lithium polysulfide, which is generated in the positive electrode, and thus can solve the problems of side reaction on the surface of negative electrode caused by its shuttle effect, for example can reacts with the lithium metal to solve the problem of forming a high-resistance layer of $Li_2S$ at the interface or precipitating at the interface of the electrode, thereby improving the coulomb efficiency and circulation stability of the battery.

In addition, the lithium polysulfide is restrained by the coating layer of the separator to suppress the diffusion movement of the lithium polysulfide to the negative electrode, thereby solving the conventional problem of the capacity loss of sulfur generated by the lithium polysulfide, and thus a high capacity battery can be realized, and safe operation is possible even when highly loading sulfur. In addition, as the lithium polysulfide is constrained, the release of sulfur from the electrochemical reaction zone of the positive electrode is minimized.

The functional group including a non-covalent electron pair may comprise at least one selected from the group consisting of an amine group comprising a primary amine group, a secondary amine group or a tertiary amine group, an ether group (—O—), an ester group (—C(=O)O—), a carbonate group (C(=O) (O—)$_2$), a carbonyl group (—C(=O)—), an imide group (—C(=O)NC(=O)—) and an amide group (—C(=O)N—), and preferably may be an amine group or an amide group, and more preferably an amine group.

Even if the leaching and shuttle phenomenon are resolved by adsorbing the lithium polysulfide by a polymer having the main chain including a functional group comprising a non-covalent electron pair, it should be coated uniformly and stably when applied to a porous substrate of separator. For this purpose, in the present invention, an aromatic hydrocarbon group is comprised in the side chain of the polymer introduced into the coating layer of the separator. The aromatic hydrocarbon group not only is excellent in adhesive force to a porous substrate due to its hydrophobic property, and thus can be uniformly coated, as well as the coating layer is not easily separated during coating or when applied to a battery. In addition, the aromatic hydrocarbon group can further improve the binding force of the coating layer through the π-π interaction with the graphitic carbon-based compound described later. At this time, it is preferable that the aromatic hydrocarbon group is located at the end of the side chain for uniform coating.

The aromatic hydrocarbon group may comprise at least one selected from the group consisting of a phenyl group, a biphenyl group, a naphthyl group, a fluorenyl group, an anthracenyl group, and a perylenyl group. Preferably, the aromatic hydrocarbon group may be at least one selected from the group consisting of a phenyl group, a naphthyl group, and a fluorenyl group, and more preferably a naphthyl group.

Accordingly, the polymer according to the present invention comprises a repeating unit having a functional group including a non-covalent electron pair in its main chain and has a linear-type or branched-type structure containing an aromatic hydrocarbon group at the side chain connected to the main chain, preferably at the end of the side chain. At this time, the term "linear-type" as used in the present invention means that a plurality of repeating units (monomers) are linked together in one chain from beginning to end. The term "branched-type" used in the present invention means that the linear-type structure is branched and the branched side chains are connected to the side of the main chain of the polymer. In particular, the polymer of the present invention excludes a dendrimer polymerized in a star-like type structure in its form. Even in the prior art, a coating layer was formed with the polymer having the amide group on a positive electrode. However, since the polymer used in this case was a dendrimer having a star-like type structure and the functional group for the adsorption of the lithium polysulfide existed inside the molecular structure, the desired adsorption effect could not be obtained sufficiently. In contrast, since the polymer according to the present invention has a linear-type or branched-type structure, which is not a dendrimer structure, and thus the functional group can sufficiently contact the lithium polysulfide, the polymer according to the present invention has advantageous properties in view of the adsorption of the lithium polysulfide.

In the present invention, the polymer may be represented by the following Chemical Formula 1:

[Chemical Formula 1]

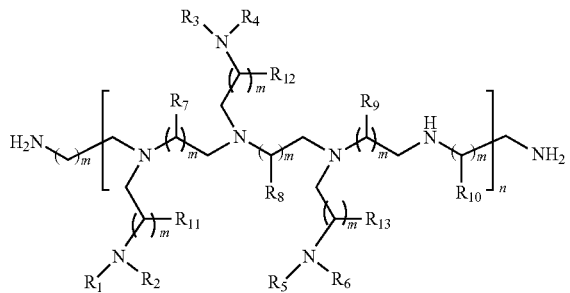

wherein $R_1$ to $R_6$ are the same as or different from each other, and are each independently hydrogen; a substituted or unsubstituted C1-C20 alkyl group; $(R_{14}R_{15})$ amino(C2-C10) alkyl group; a substituted or unsubstituted C3-C20 cycloalkyl group; a substituted or unsubstituted C6-C20 aryl group or a substituted or unsubstituted C4-C20 heteroaryl group; or $R_1$ and $R_2$, $R_3$ and $R_4$ and $R_5$ and $R_6$, together with an amide bond or an imide bond including nitrogen, form each independently a to 50-membered ring including a substituted or unsubstituted C6-C20 aryl group or a substituted or unsubstituted C4-C20 heteroaryl group;

$R_{14}$ and $R_{15}$ are the same as or different from each other, and are each independently hydrogen; a substituted or unsubstituted C1-C20 alkyl group; a substituted or unsubstituted C3-C20 cycloalkyl group; a substituted or unsubstituted C6-C20 aryl group or a substituted or unsubstituted C4-C20 heteroaryl group; or together with an amide bond or an imide bond including nitrogen, form a 5 to 50-membered ring including a substituted or unsubstituted C6-C20 aryl group or a substituted or unsubstituted C4-C20 heteroaryl group;

$R_1$ and $R_2$, $R_3$ and $R_4$, $R_5$ and $R_6$ and $R_{14}$ and $R_{15}$ may be bonded to each other to form an aliphatic or aromatic ring including a heteroatom;

At least one of $R_1$ to $R_6$ comprises an aromatic ring, or is connected to another substituent of adjacent $R_1$ to $R_6$ through an aromatic ring;

$R_7$ to $R_{13}$ are the same as or different from each other, and are each independently hydrogen, oxygen or a substituted or unsubstituted C1-C10 alkyl group, and when $R_7$ to $R_{13}$ are oxygen, they form a double bond with the bonded carbon atom;

m is each independently an integer of 0 to 5; and
n is an integer from 5 to 5,000.

The term "hydrocarbon group" as used in the present invention refers to all organic groups consisting of carbon and hydrogen and may comprise any known structures such as an alkyl group, an alkenyl group, an alkynyl group, an aryl group, an aralkyl group, a heteroaryl group, and the like. The carbon in the hydrocarbon group may be replaced with at least one heteroatom selected from the group consisting of oxygen (O), nitrogen (N), and sulfur (S). The hydrocarbon group comprises straight chain, branched chain, monocyclic or polycyclic groups, and at least one hydrogen atom contained in the hydrocarbon group is optionally substituted with one or more substituents (e.g., alkyl, alkenyl, alkynyl, heterocyclic, aryl, heteroaryl, acyl, oxo, imino, thiooxo, cyano, isocyano, amino, azido, nitro, hydroxyl, thiol, halo and the like).

The term "alkyl group" used in the present invention may be a straight chain or branched chain, and the number of carbon atoms is not particularly limited, but is preferably to 20, specifically 1 to 10. Specific examples thereof comprise, but are not limited to, methyl group, ethyl group, propyl group, isopropyl group, butyl group, t-butyl group, pentyl group, hexyl group, and heptyl group.

The term "cycloalkyl group" used in the present invention refers to a saturated or unsaturated monovalent monocyclic, bicyclic or tricyclic non-aromatic hydrocarbon group having 3 to 20, preferably 3 to 12 ring-carbon atoms, which may be further substituted by a certain substituent group described later. Examples thereof comprise cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo [2,2,1]hept-5-enyl) and the like.

The term "aryl group" used in the present invention refers to a single or multiple aromatic carbon-based ring having 6 to 20 carbon atoms. Examples thereof comprise, but are not limited to, phenyl group, biphenyl group, fluorenyl group and the like.

The term "heteroaryl group" as used in the present invention refers to an aryl group having 4 to 40, preferably 4 to 20 ring atoms in which at least one carbon in the ring is substituted with a heteroatom such as nitrogen (N), oxygen (O), sulfur (S), phosphorus (P), or the like. For example, the heteroaryl group refers to a monocyclic or bicyclic or higher aromatic group containing 1 to 4 heteroatoms. Examples of the monocyclic heteroaryl group comprise, but are not limited to, a triazolyl group, an oxazolyl group, a thiophenyl group, a furanyl group, a pyrrolyl group, an imidazolyl group, an isoxazolyl group, a pyrazolyl group, a triazolyl group, a thiadiazolyl group, a tetrazolyl group, an oxadiazolyl group, a pyridinyl group, a pyridazinyl group, a pyrimidinyl group, a pyrazinyl group, and similar groups. Examples of the bicyclic heteroaryl group comprise, but are not limited to, an indolyl group, a benzo thiophenyl group, a benzofuranyl group, a benzimidazolyl group, a benzoxazolyl group, a benzisoxazolyl group, a benzthiazolyl group, a benzthiadiazolyl group, a benztriazolyl group, a quinolinyl group, an isoquinolinyl group, a purinyl group, a furopyridinyl group, and similar groups.

Preferably, $R_1$ to $R_6$ in Chemical Formula 1 are the same as or different from each other, and may be each independently hydrogen or $(R_{14}R_{15})$amino(C2-C5) alkyl group; or $R_1$ and $R_2$, $R_3$ and $R_4$ and $R_5$ and $R_6$, together with an amide bond or an imide bond including nitrogen, may form each independently a 5 to 50-membered ring including a substituted or unsubstituted C6-C20 aryl group or a substituted or unsubstituted C4-C20 heteroaryl group. More preferably, $R_1$ to $R_6$ are the same as or different from each other, and may be each independently hydrogen or $(R_{14}R_{15})$amino(C2-C5) alkyl group. Also, $R_{14}$ and $R_{15}$ are the same as or different from each other, and may be each independently hydrogen; a substituted or unsubstituted C4-C20 heteroaryl group; or together with an amide bond or an imide bond including nitrogen, may form a 5 to 50-membered ring including a substituted or unsubstituted C6-C20 aryl group or a substituted or unsubstituted C4-C20 heteroaryl group. At this time, at least one of $R_4$ and $R_2$, $R_3$ and $R_4$, $R_5$ and $R_6$ and $R_{14}$ and $R_{15}$ may be connected with each other to form a ring including an amide bond or an imide bond with nitrogen in the side chain, and for example, may be a 1,8-naphthalimide group.

In addition, preferably, $R_7$ to $R_{13}$ in Chemical Formula 1 are the same as or different from each other, and may be each independently hydrogen.

In addition, preferably, m in Chemical Formula 1 may be an integer of 1 to 3, and it is easy to prepare when m in the main chain is the same as m in the side chain. Even when m in the main chain is different from m in the side chain, all of m in the main chain and all m in the side chain may be the same, respectively.

In addition, preferably, n in Chemical Formula 1 may be an integer of 5 to 5,000.

For example, the polymer represented by Chemical Formula 1 may be represented by the following Chemical Formula 2:

[Chemical Formula 2]

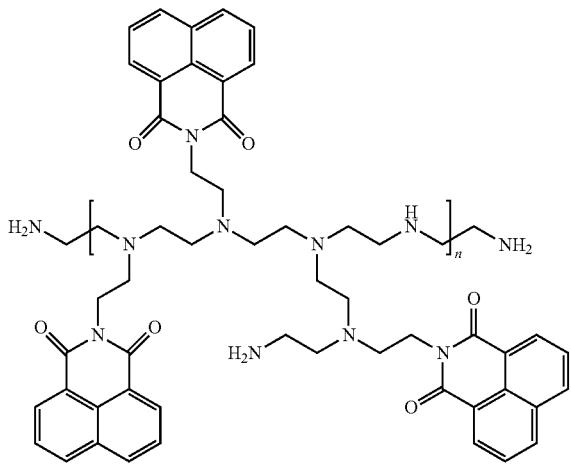

wherein n is an integer of 5 to 5,000.

The polymer may have a number average molecular weight ($M_n$) of from 200 to 200,000, preferably from 500 to 60,000.

In addition, the polymer may have a polydispersity index (PDI) of from 1.05 to 20, preferably from 1.3 to 10, more preferably from 1.3 to 4. At this time, the term "polydispersity index" used in the present invention refers to a value obtained by dividing a weight average molecular weight by a number average molecular weight, which means a weight average molecular weight/number average molecular weight ($M_w/M_n$).

When the number average molecular weight and polydispersity index of the polymer are less than the above-mentioned ranges respectively, it is difficult to produce the polymer having the structure proposed in the present invention or the same properties as the dendrimer can be exhibited. On the contrary, when the number average molecular weight and polydispersity index of the polymer exceed the above-mentioned ranges, respectively, there may cause a problem that the physical properties are not uniform.

When the coating layer containing the polymer is formed on one side of the porous substrate, the coating layer may be located anywhere on the side of the negative electrode or the positive electrode, and is not particularly limited in the present invention. Preferably, the coating layer may be formed to face the positive electrode.

Even if the problem caused by lithium polysulfide is solved through the coating layer comprising the polymer, when applied to the battery as an actual separator, there is a new problem that the permeability to electrolytes and ions is reduced and the lithium ion transfer rate is slowed down.

That is, when the coating layer is formed on the separator by the polymer, a sufficient level of path through which lithium ions can be transferred cannot be secured, so that the lithium ions cannot be easily transferred. In other words, when a liquid electrolyte is used, the separator must be present in a form sufficiently impregnated with the liquid electrolyte so that lithium ions pass through the separator and are transferred to the positive electrode and the negative electrode. However, in the case where the coating layer is comprised only of the polymer, it is difficult for the electrolyte to contact with the porous substrate, so that the lithium ion transfer rate is slowed down. This slowed lithium ion transfer rate increases the internal impedance of the battery along with low lithium ion conductivity, thereby resulting in a problem of deteriorating the performance of the battery.

Accordingly, the present invention comprises a graphitic carbon-based compound together with the polymer in the coating layer.

The graphitic carbon-based compound forms a pore structure to exhibit a high wettability with respect to an electrolyte and has a high electron conductivity to reduce lithium polysulfide adsorbed by the polymer to lithium sulfide, thereby playing a role in inhibiting leaching.

The graphitic carbon-based compound may comprise at least one selected from the group consisting of graphene oxide, reduced graphene oxide (rGO), thermally-expanded reduced graphene oxide (TErGO), and graphite oxide, and preferably may be the reduced graphene oxide.

For example, the graphitic carbon-based compound of the present invention may be a graphite oxide obtained through oxidation of graphite or a reduced graphene oxide obtained by reducing graphene oxide which is obtained by ultrasonication of the graphite oxide. At this time, the oxidation or reduction can be carried out according to a known method or various methods of modifying it by a person skilled in the art, and is not particularly limited in the present invention. The reduction treatment may be performed by a chemical reduction using a reducing agent, a heat treatment reduction method, a microwave reduction method, a plasma reduction method, a hydrogen gas exposure, or the like. At this time, the reducing agent may be any one or more selected from the group consisting of hydrazine hydrate, potassium hydroxide, sodium borohydride, sodium hydroxide, sodium bisulfate, sodium sulfite, thionyl chloride, sulfur dioxide and ascorbic acid or a mixture of two or more thereof. For example, the heat treatment reduction method may be carried out at a temperature of from 300 to 1200° C., preferably from 500 to 1000° C. for from 30 minutes to 24 hours, preferably from 2 hours to 6 hours. In addition, the heat treatment reduction method may be performed under at least one gas atmosphere selected from the group consisting of methane, hydrogen, nitrogen, helium, neon, argon, and a mixed gas thereof.

Further, in the case of thermal expansion-reduced graphene oxide, it may be produced by thermal treatment of the graphene oxide to produce a thermal expansion graphene oxide, followed by reduction of the thermal expansion oxide. At this time, the heat treatment for preparation of the thermal expansion graphene oxide may be carried out according to a known method or various methods of modifying it by a person skilled in the art, and is not particularly limited in the present invention. For example, the heat treatment may be performed at a temperature range of from 300 to 900° C. for from 10 minutes to 3 hours.

In particular, the graphitic carbon-based compound of the present invention may be a peeled graphitic carbon-based compound having a thickness of from 0.5 to 40 nm, preferably from 5 to 30 nm, more preferably from 10 to 20 nm. In addition, the graphitic carbon-based compound has a plate or flake shape. In general, the reduced graphene oxide before peeling has a thickness of from 50 to 500 nm and is in the form of particles, and therefore, it is easily separated when coated, so that not only the use of a binder is required but also the coating density is low, and thus the desired effect cannot be sufficiently obtained. In comparison with this, in the case of the present invention, the reduced graphene oxide in the form of plate or flake shape having a certain range of thickness through peeling is used, and thus the coating can be uniformly and densely applied on the substrate.

In the coating layer according to the present invention, the weight ratio of the polymer and the graphitic carbon-based compound may be from 1:10 to 10:1, preferably from 1:2 to 5:1, more preferably from 1:1 to 2:1. When the ratio of the polymer in the weight ratio range is increased, the permeability of the separator to the electrolyte and ions may be deteriorated and thus the battery performance may be deteriorated. On the contrary, when the ratio of the graphitic carbon-based compound is increased, the leaching of the lithium polysulfide is not sufficiently inhibited, and thus the desired effect cannot be obtained.

The thickness of the coating layer is not particularly limited, and has a range that does not increase the internal resistance of the battery while ensuring the above effect. For example, the thickness may be from 0.1 to 50 μm, preferably from 0.1 to 10 μm, more preferably from 0.3 to 1 μm. When the thickness of the coating layer is less than the above range, it cannot function as a coating layer. On the contrary, when the thickness of the coating layer exceeds the above range, the interfacial resistance may increase, thereby leading to an increase in internal resistance during operating of the battery.

A method for preparing the separator for the lithium-sulfur battery proposed in the present invention is not particularly limited in the present invention, and a variety of methods known to those skilled in the art, or variations thereof, are available.

As an example, a method for preparing the separator for the lithium-sulfur battery comprises the steps of:
  (a) preparing a coating composition which comprises a polymer including a main chain having a functional group having a non-covalent electron pair and a side chain substituted with an aromatic hydrocarbon group, and which comprises a graphitic carbon-based compound, and
  (b) applying the coating composition to at least one side of the separator substrate.

In the coating composition described above, the polymer comprises a polymer represented by the following Chemical Formula 1, and may be prepared by reacting the polymer composition having a functional group including a non-covalent electron pair and the compound comprising an aromatic hydrocarbon group as described above:

[Chemical Formula 1]

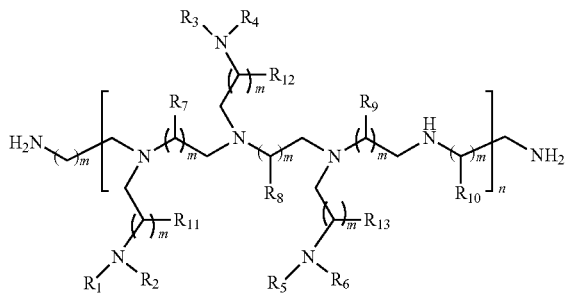

wherein $R_1$ to $R_{13}$, m and n are as described above.

The polymer having the functional group including the non-covalent electron pair is as described above.

As the compound including the aromatic hydrocarbon group, those capable of introducing an aromatic hydrocarbon group into the polymer used in the present invention may be used. As an example, the compound including the aromatic hydrocarbon group may be at least one selected from the group consisting of 1,8-naphthalic anhydride, phthalic anhydride, succinic anhydride, maleic anhydride, glutaric anhydride, 3,4,5,6-tetrahydrophthalic anhydride, homophthalic anhydride, phenylsuccinic anhydride, 3,4-pyridinedicarboxylic anhydride, phenylmaleic anhydride, 4-amino-1,8-naphthalic anhydride, 3-hydroxyphthalic anhydride, 2-phenylglutaric anhydride, tetrafluorophthalic anhydride, 4,4'-oxydiphthalic anhydride, 2,3-pyrazinedicarboxylic anhydride, 2,3-diphenylmaleic anhydride, 3,6-difluorophthalic anhydride, 2-(triphenylphosphoranylidene)succinic anhydride, 2,3-pyridinedicarboxylic anhydride, 2-benzylsuccinic anhydride, 4-fluorophthalic anhydride, 3-fluorophthalic anhydride, 1-phenyl-2,3-naphthalenedicarboxylic anhydride, cyclobutane-1,2,3,4-tetracarboxylic dianhydride, 3,6-dimethylphthalic anhydride, tetraphenylphthalic anhydride, benzo(ghi)perylene-1,2-dicarboxylic anhydride, bicyclo[2.2.2]octane-2,3-dicarboxylic anhydride, tetraphenyl-1,2-dihydrophthalic anhydride, pyromellitic dianhydride, 1,4,5,8-naphthalenetetracarboxylic dianhydride and perylene-3,4,9,10-tetracarboxylic dianhydride, and preferably may be at least one selected from the group consisting of 1,8-naphthalic anhydride, 1,4,5,8-naphthalenetetracarboxylic dianhydride and perylene-3,4,9,10-tetracarboxylic dianhydride, and more preferably may be 1,8-naphthalic anhydride.

The graphitic carbon-based compound is as described above.

The coating composition may further comprise a solvent and the solvent is not particularly limited as long as it can dissolve the above-mentioned components. As an example, the solvent may be a mixed solvent of water and alcohol, or a mixture of one or more organic solvents. In that case, the alcohol may be a lower alcohol having 1 to 6 carbon atoms, preferably methanol, ethanol, propanol, isopropanol, or the like. Examples of the organic solvent may comprise polar solvents such as acetic acid, dimethyl formamide (DMF), N-methyl-2-pyrrolidone (NMP) and dimethyl sulfoxide (DMSO), and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride, methylene chloride, tetrahydrofuran (THF), etc. Preferably, at least one selected from the group consisting of dimethylformamide, methylene chloride, and N-methyl-2-pyrrolidone may be used.

The content of the solvent may be contained at a level of having such a concentration as to facilitate the coating, and the specific content varies depending on the coating method and apparatus. As an example, the polymer composition and the compound including the aromatic hydrocarbon group can be dispersed in the solution and then mixed to prepare a coating solution. In that case, the concentration of the final coating solution is adjusted to be in the range of from 0.005 to 20% by weight (solids content), and then the coating can be carried out.

The coating in this step is not particularly limited, and any known wet coating method can be used. As an example, a method of uniformly dispersing using a doctor blade or the like, die casting, comma coating, screen printing, vacuum filtration coating, and the like can be mentioned.

Then, a drying process for removing the solvent after coating may be performed. The drying process may be performed at a temperature and a time sufficient to sufficiently remove the solvent. The conditions may vary depending on the type of the solvent, and therefore, it is not specifically mentioned in the present invention. As an example, the drying can be carried out in a vacuum oven of from 30 to 200° C., and the drying method may comprise drying methods such as warm-air drying, hot air drying, drying by low humidity air, or vacuum drying. The drying time is not particularly limited, but is usually in the range of from 30 seconds to 24 hours.

The coating thickness of the coating layer to be finally formed may be controlled by adjusting the concentration of the composition for the coating according to the present invention, the number of times of coating, or the like.

Also, the present invention provides a lithium-sulfur battery comprising the separator described above.

The lithium-sulfur battery comprises a positive electrode, a negative electrode, and a separator and an electrolyte interposed between the positive electrode and the negative electrode, wherein the separator comprises the separator according to the present invention.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material may comprise a positive electrode active material and optionally an electrically conductive material, and a binder.

The positive electrode active material comprises a sulfur-based compound. The sulfur-based compound may be at least one selected from the group consisting of inorganic sulfur ($S_8$), $Li_2S_n(n\geq1)$, a disulfide compound, an organic sulfur compound, and a carbon-sulfur polymer (($C_2S_x)_n$: x=2.5 to 50, n≥2). Preferably, inorganic sulfur ($S_8$) may be used.

The sulfur-based compound is used in combination with an electrically conductive material because it does not have electrical conductivity alone. Preferably, the positive electrode active material may be a sulfur-carbon composite.

The carbon in the sulfur-carbon composite is a porous carbon material and provides a framework capable of uniformly and stably immobilizing sulfur, which is a positive electrode active material, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of from 1 to 200 nm, and the porosity may be in the range of from 10 to 90% of the total volume of the porous carbon material. When the average diameter of the pores is less than the above range, the pore size is only at the molecular level and impregnation with sulfur is impossible. On the contrary, when the average diameter of the pores exceeds the above range, the mechanical strength of the porous carbon is weakened, which is not preferable for application to the manufacturing process of the electrode.

The shape of the porous carbon material may be in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as denka black, acetylene black, ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and natural graphite, artificial graphite, expanded graphite, and activated carbon. Preferably, the porous carbon material may be carbon nanotubes.

The positive electrode active material may further comprise at least one additive selected from a transition metal element, a group IIIA element, a group IVA element, a sulfur compound of these elements, and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Ti and the like, and the group IVA element may comprise Ge, Sn, Pb, and the like.

In addition, the positive electrode may further comprise an electrically conductive material, and the electrically conductive material is a material that acts as a path, through which electrons are transferred from the current collector to the positive electrode active material, by electrically connecting the electrolyte and the positive electrode active material. The electrically conductive material can be used without limitation as long as it has porosity and electrical conductivity.

For example, carbon-based materials having porosity may be used as the electrically conductive material. Such carbon-based materials may comprise carbon black, graphite, graphene, activated carbon, carbon fiber, and the like. In addition, metallic fibers such as metal mesh; metallic powder such as copper, silver, nickel, and aluminum; or organic electrically-conductive materials such as polyphenylene derivatives may be also used. The electrically conductive materials may be used alone or in combination.

In addition, the positive electrode may further comprise a binder. The binder enhances adhesion force between the components constituting the positive electrode and between them and the current collector, and any binder known in the art can be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The positive electrode may be prepared by a conventional method known in the art. For example, the positive electrode can be prepared by mixing and stirring a solvent, if necessary, a binder, an electrically conductive material, and a dispersant in a positive electrode active material to prepare a slurry, then applying (coating) the slurry to a current collector of a metal material, compressing and drying it.

The negative electrode may comprise a material capable of reversibly intercalating or deintercalating lithium ($Li^+$), a material capable of reversibly forming lithium containing compounds by reacting with lithium ion, or lithium metal or lithium alloy as a negative electrode active material. The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically may be in the form of a lithium metal thin film or lithium metal powder.

The negative electrode current collector is as described for the positive electrode current collector.

In addition, the negative electrode may further comprise additives such as a binder, a conductive material, and a thickener, and is not particularly limited as long as they are typical materials used in manufacturing a negative electrode.

The separator is as described above.

The electrolyte comprises lithium ions and is used for causing an electrochemical oxidation or reduction reaction between a positive electrode and a negative electrode through these.

The electrolyte may be a non-aqueous electrolyte or a solid electrolyte which does not react with lithium metal, but may be preferably a non-aqueous electrolyte, and comprises an electrolyte salt and an organic solvent.

The electrolyte salt which is comprised in the non-aqueous electrolyte is lithium salt. The lithium salt can be used without limitation as long as it is commonly used in an electrolyte for a lithium secondary battery. For example, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $LiN(SO_2F)_2$, lithium chloroborane, lithium lower aliphatic carboxylate, lithium tetraphenylborate, lithium imide, etc.

The concentration of the lithium salt may be from 0.2 to 2 M, specifically from 0.4 to 2 M, more specifically from 0.4 to 1.7 M depending on various factors such as the exact composition of the electrolyte solvent mixture, the solubility of the salt, the conductivity of the dissolved salt, the charging and discharging conditions of the battery, the operating temperature, and other factors known in the lithium battery field. When the concentration of the lithium salt is less than 0.2 M, the conductivity of the electrolyte may be lowered and thus the performance of the battery may be deteriorated. When the concentration of the lithium salt is more than 2 M, the viscosity of the electrolyte may increase and thus the mobility of the lithium ion may be reduced.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, ether-based compounds may be comprised.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether.

For example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

Examples of the ester of the organic solvent may include, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, and a mixture of two or more thereof.

Specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides include, but are not limited to, fluoroethylene carbonate (FEC) and the like.

The injection of the nonaqueous electrolyte solution may be performed at an appropriate stage of the manufacturing processes of the electrochemical device, depending on the manufacturing process and required properties of the final product. That is, the injection may be performed before assembling the electrochemical device or at the final stage of assembling the electrochemical device.

The lithium secondary battery according to the present invention may be manufactured by lamination, stacking, and folding processes of the separator and the electrodes, in addition to the usual winding process.

The shape of the lithium secondary battery is not particularly limited, and may be various shapes such as a cylindrical shape, a laminate shape, and a coin shape.

Also, the present invention provides a battery module including the lithium-sulfur battery described above as a unit battery.

The battery module may be used as a power source for medium to large-sized devices requiring high temperature stability, long cycle characteristics, high capacity characteristics, and the like.

Examples of such medium to large-sized devices may comprise, but is not limited to, a power tool powered and moved by an electric motor; an electric car including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; a power storage system, etc.

MODE FOR INVENTION

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and those such variations and modifications are within the scope of the appended claims.

PREPARATION EXAMPLES

Preparation of Polymer to Form Coating Layer

Preparation Example 1

5.0 g of branched polyethylene imine (branched PEI (b-PEI600), $M_n$ 600 g/mol, product from Sigma Aldrich) and 6.9 g of 1,8-naphthalic anhydride (product from Sigma Aldrich) were dissolved in dimethyl formamide, and stirred at 90° C. for 48 hours to prepare polyethyleneimine (PEI600-NA) substituted with 1,8-naphthalic anhydride.

Preparation Example 2

2.0 g of branched polyethylene imine (branched PEI (b-PEI10k), $M_n$ 10,000 g/mol, product from Sigma Aldrich) and 2.76 g of 1,8-naphthalic anhydride (product from Sigma Aldrich) were dissolved in dimethylformamide, and stirred at 90° C. for 48 hours to prepare polyethyleneimine (PEI10k-NA) substituted with 1,8-naphthalic anhydride.

Preparation Example 3

0.025 g of fourth generation polyamidoamine (product from Sigma Aldrich) and 0.0268 g of 1,8-naphthalic anhydride (product from Sigma Aldrich) were dissolved in dimethylformamide, and stirred at 90° C. for 48 hours to prepare polyamidoamine dendrimer substituted with 1,8-naphthalic anhydride.

Experimental Example 1

Evaluation of Physical Properties of Polymer

The physical properties of the polymers obtained in the above Preparation Examples and the branched polyethylene imine before substitution were measured. At this time, the results obtained are shown in FIGS. 1 to 4. The evaluation methods of the physical properties are as follows.

(1) $^1$H NMR (Nuclear Magnetic Resonance) Measurement

The branched polyethylene imine before substitution and the polymer according to Preparation Example 1 were dissolved in a $CDCl_3$ solvent and measured using an NMR spectrometer (Bruker 700 MHz NMR, product from Bruker).

(2) TGA (Thermogravimetric Analyzer) Measurement

The branched polyethylene imine before substitution and the polymer according to Preparation Example 1 and 2 was measured under $N_2$ condition using a thermogravimetric analyzer (TGA/DSC 2, product from Mettler Toledo).

(3) DSC (Differential Scanning Calorimeters) Measurement

The branched polyethylene imine before substitution and the polymer according to Preparation Example 2 were measured using a differential scanning calorimeter (Perkin Elmer DSC 8000) from −80° C. to 200° C. at a rate of 10° C./min.

Referring to FIG. 1, it can be confirmed, through the presence of peaks in the range of from 7.2 to 8.5 which were not present in the case of the branched polyethylene imine before the substitution, that in the case of the polymer prepared according to Preparation Example 1, the side chain is substituted with an aromatic hydrocarbon group derived from 1,8-naphthalic anhydride.

Figure 2:
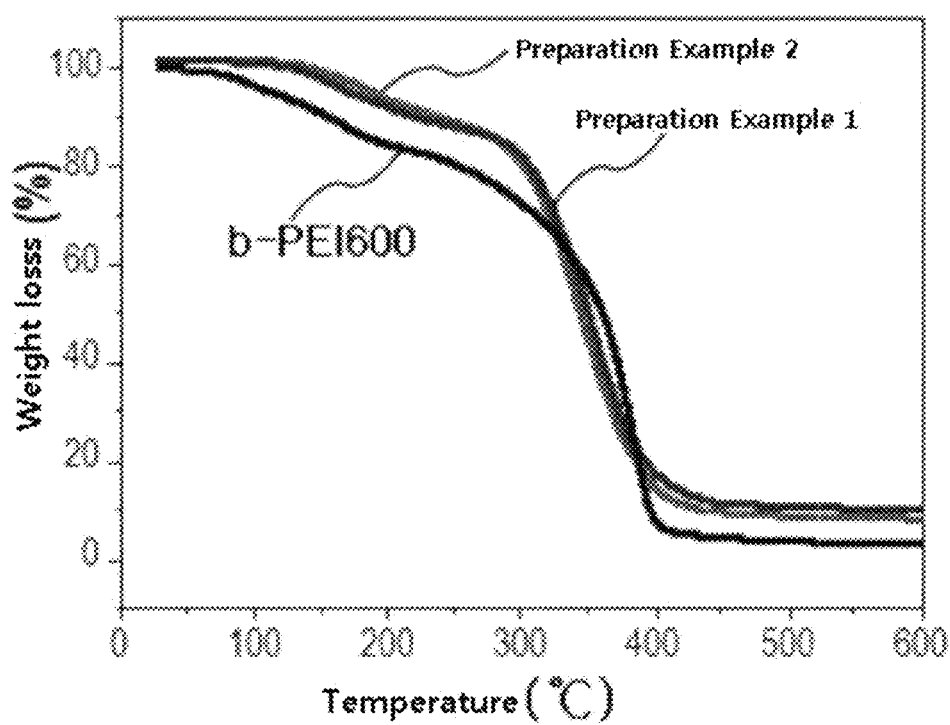
FIG. 2 is a graph showing TGA measurement results according to Experimental Example 1 of the present invention.
Figure 3:
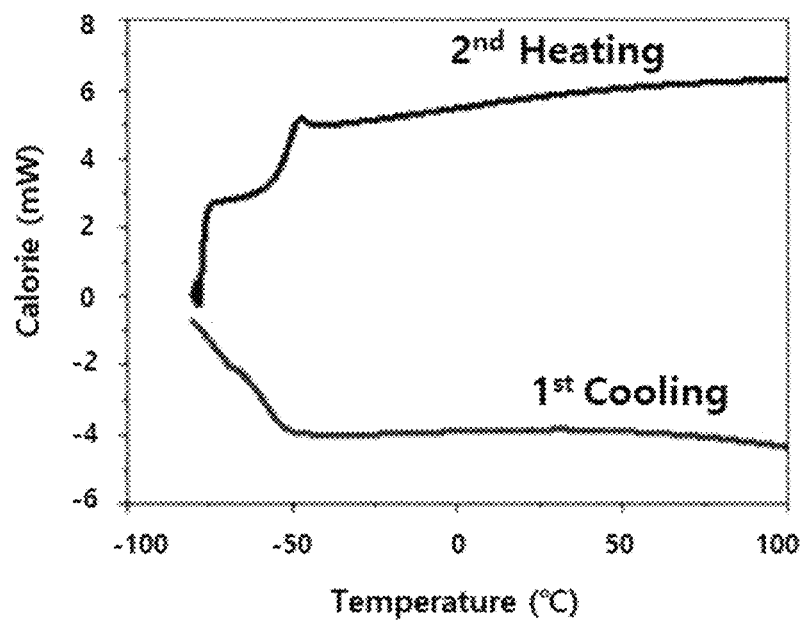
FIG. 3 is a graph showing DSC measurement results of b-PEI10k according to Experimental Example 1 of the present invention.
Figure 4:
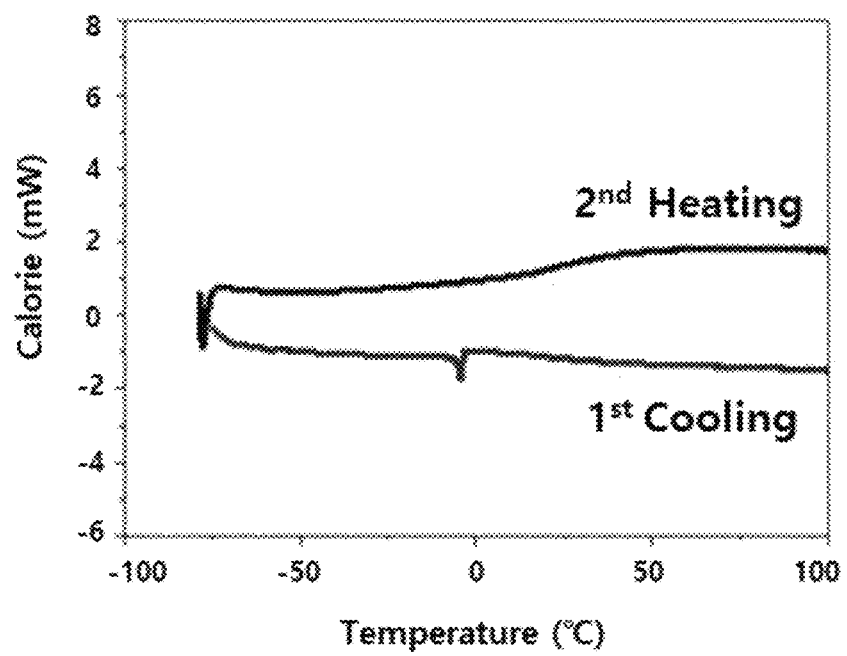
FIG. 4 is a graph showing DSC measurement results of Preparation Example 2 according to Experimental Example 1 of the present invention.
Figure 5:
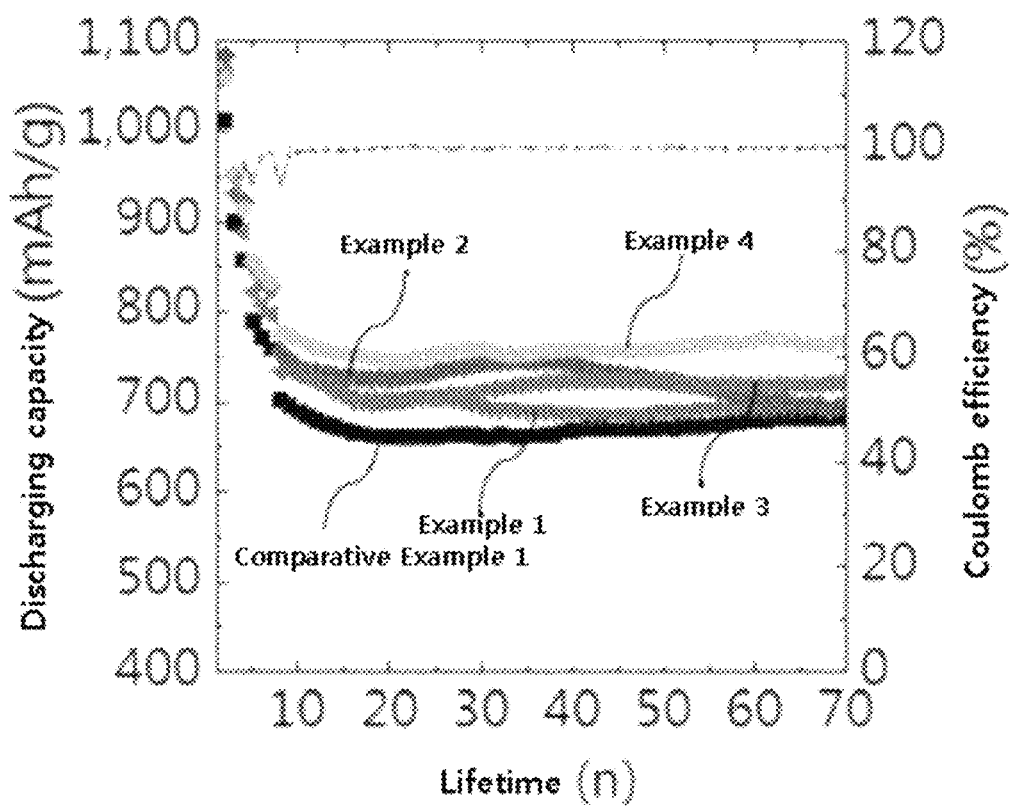
FIG. 5 is a graph showing the performance evaluation results of the batteries of Examples 1 to 4 and Comparative Example 1 according to Experimental Example 2 of the present invention.
Figure 6:
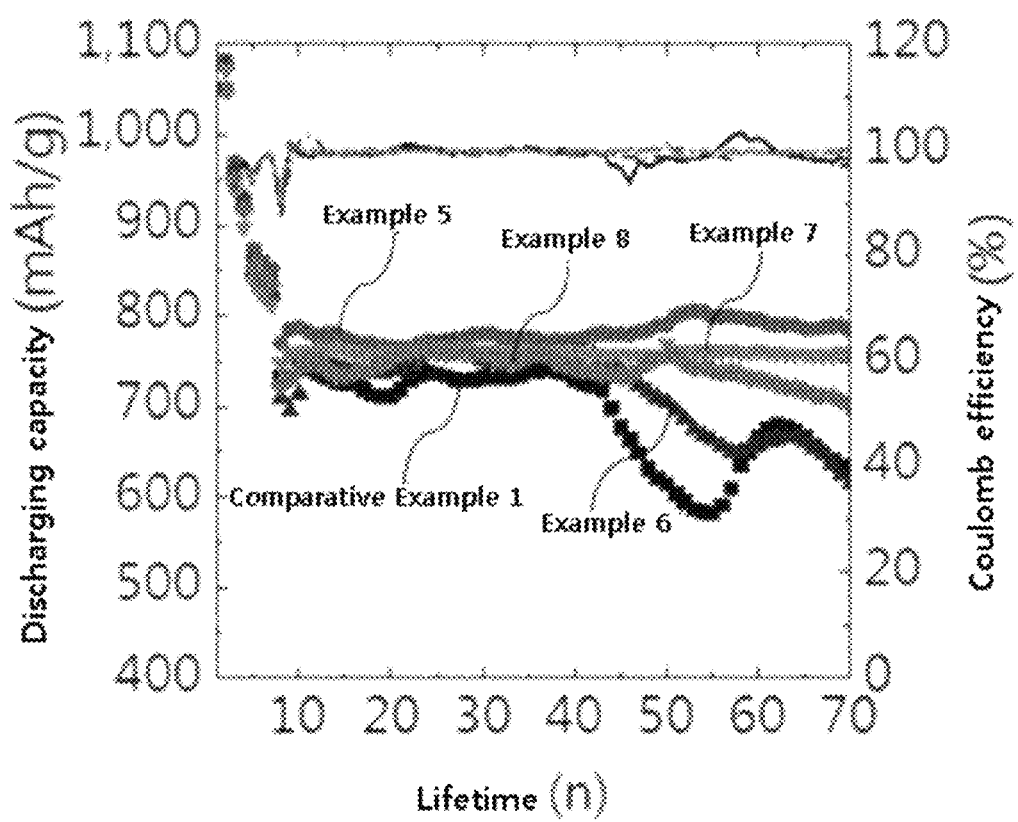
FIG. 6 is a graph showing the performance evaluation results of the batteries of Examples 5 to 8 and Comparative Example 1 according to Experimental Example 2 of the present invention.
Figure 7:
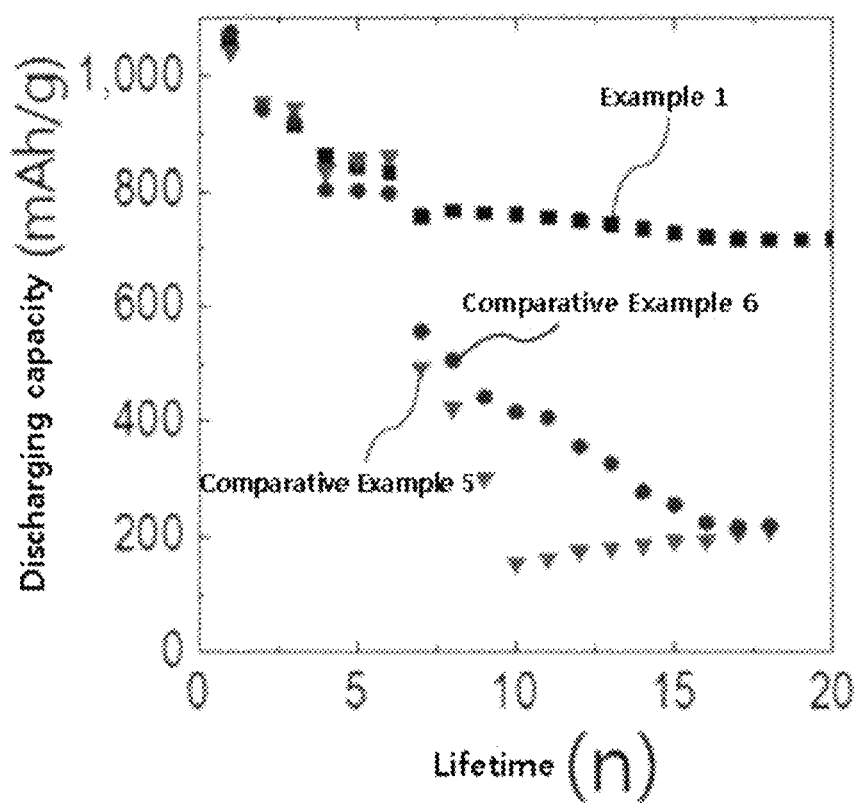
FIG. 7 is a graph showing the performance evaluation results of the batteries of Example 1, and Comparative Examples 5 and 6 according to Experimental Example 2 of the present invention.
Figure 8:
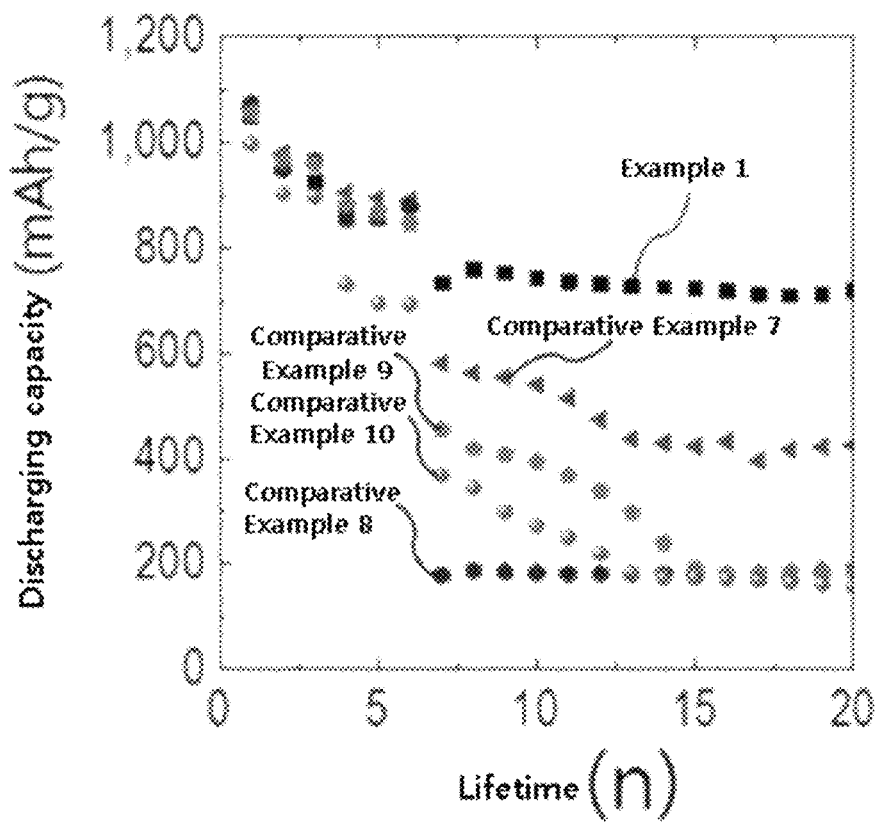
FIG. 8 is a graph showing the performance evaluation results of the batteries of Example 1, and Comparative Examples 7 to 10 according to Experimental Example 2 of the present invention.

In addition, as shown in FIGS. 2 to 4, it can be confirmed that in the case of the polymers according to Preparation Examples 1 and 2, the thermal decomposition temperature and the glass transition temperature are increased as compared with the non-substituted branched polyethyleneimine.

EXAMPLES AND COMPARATIVE EXAMPLES

Example 1

(1) Manufacture of Separator

As a porous substrate, 20 μm of polyethylene (porosity of 68%) film was prepared.

Graphene oxide (5E2430, product of Sixth Element) was heat-treated at 300° C. for 1 hour for reduction, and then the peeled reduced graphene oxide (thickness of 15 nm) was prepared using a high-speed mixer and an ultrasonic homogenizer The coating composition comprising the reduced graphene oxide and the polymer obtained in Preparation Example 1 at a weight ratio of 1:1 in ethanol was coated on the porous substrate to form a coating layer and then dried at 60° C. for 12 hours to prepare a separator having a coating layer with a thickness of 0.3 μm.

(2) Manufacture of Lithium-Sulfur Battery

Sulfur was mixed with the conductive material and the binder in acetonitrile using a ball mill to prepare a slurry of the positive electrode active material. At this time, carbon black was used as the electrically conductive material, and polyethylene oxide (molecular weight: 5,000,000 g/mol) was used as the binder, and the mixing ratio was set to 60:20:20 by weight of the sulfur:electrically conductive material:binder. The slurry of the positive electrode active material was coated on an aluminum current collector and dried to produce a positive electrode.

Together with the above positive electrode, a lithium metal thin film with a thickness of 45 μm was used as a negative electrode. A mixed solution prepared by dissolving M of lithium bis(trifluoromethanesulfonyl)imide (LiTFSI) and 1% by weight of lithium nitrate (LiNO$_3$) in an organic solvent consisting of 1,3-dioxolane and dimethyl ether (DOL:DME=1:1 (volume ratio)) was used as an electrolyte.

Specifically, the prepared positive electrode and the negative electrode were positioned to face each other and the separator was interposed therebetween. Thereafter, 100 μl of the electrolyte was injected to prepare a coin-type lithium-sulfur battery.

Example 2

A coin-type lithium-sulfur battery was prepared in the same manner as in Example 1, except that a coating layer with a thickness of 0.7 μm was formed in the manufacture of the separator.

Example 3

A coin-type lithium-sulfur battery was prepared in the same manner as in Example 1, except that a coating composition comprising reduced graphene oxide and the polymer obtained in Preparation Example 1 in a weight ratio of 1:2 was used in the manufacture of the separator.

Example 4

A coin-type lithium-sulfur battery was prepared in the same manner as in Example 3, except that a coating layer with a thickness of 0.6 μm was formed in the manufacture of the separator.

Example 5

A coin-type lithium-sulfur battery was prepared in the same manner as in Example 1, except that a coating composition comprising reduced graphene oxide and the polymer obtained in Preparation Example 2 in a weight ratio of 1:1 was used in the manufacture of the separator.

Example 6

A coin-type lithium-sulfur battery was prepared in the same manner as in Example 5, except that a coating layer with a thickness of 0.7 μm was formed in the manufacture of the separator.

Example 7

A coin-type lithium-sulfur battery was prepared in the same manner as in Example 5, except that a coating composition comprising reduced graphene oxide and the polymer obtained in Preparation Example 2 in a weight ratio of 1:2 was used in the manufacture of the separator.

Example 8

A coin-type lithium-sulfur battery was prepared in the same manner as in Example 7, except that a coating layer with a thickness of 0.6 μm was formed in the manufacture of the separator.

Comparative Example 1

A coin-type lithium-sulfur battery was prepared in the same manner as in Example 1, except that a porous substrate as it is without a coating layer was used as a separator.

Comparative Example 2

A coin-type lithium-sulfur battery was prepared in the same manner as in Example 1, except that a coating composition prepared by dissolving the polymer obtained in Preparation Example 3 in methylene chloride in an amount of 1% by weight was used in the manufacture of the separator.

Comparative Example 3

A coin-type lithium-sulfur battery was prepared in the same manner as in Example 1, except that a coating composition containing only 0.1% by weight of reduced graphene oxide was used in the manufacture of the separator.

Comparative Example 4

A coin-type lithium-sulfur battery was prepared in the same manner as in Comparative Example 3, except that a coating layer with a thickness of 0.7 μm was formed in the manufacture of the separator.

Comparative Example 5

A coin-type lithium-sulfur battery was prepared in the same manner as in Example 1, except that in the manufacture of the separator, a coating composition prepared by mixing the reduced graphene oxide not subjected to peeling treatment:the polymer obtained in Production Example 1: poly(vinylpyrrolidone) (M$_w$ 360,000 g/mol, product from Sigma-Aldrich) as a binder in a weight ratio of 1:1:20 was used and a coating layer with a thickness of 5.0 μm was formed.

Comparative Example 6

A coin-type lithium-sulfur battery was prepared in the same manner as in Comparative Example 5, except that a coating layer with a thickness of 12.0 μm was formed in the manufacture of the separator.

Comparative Example 7

A coin-type lithium-sulfur battery was prepared in the same manner as in Example 1, except that a coating composition comprising reduced graphene oxide and the polymer obtained in Preparation Example 3 in a weight ratio of 1:1 was used in the manufacture of the separator.

Comparative Example 8

A coin-type lithium-sulfur battery was prepared in the same manner as in Comparative Example 7, except that a coating layer with a thickness of 0.7 μm was formed in the manufacture of the separator.

Comparative Example 9

A coin-type lithium-sulfur battery was prepared in the same manner as in Comparative Example 7, except that a coating composition comprising reduced graphene oxide and the polymer obtained in Preparation Example 3 in a weight ratio of 1:2 was used in the manufacture of the separator.

Comparative Example 10

A coin-type lithium-sulfur battery was prepared in the same manner as in Comparative Example 9, except that a coating layer with a thickness of 0.6 μm was formed in the manufacture of the separator.

Experimental Example 2

Evaluation of Battery Performance

The batteries manufactured in the above Examples and Comparative Examples were repeatedly discharged and charged 2.5 times at a current density of 0.1 C, discharged and charged three times at a current density of 0.2 C, and then confirmed for battery performance by measuring the discharging capacity and coulomb efficiency while conducting the discharging at 0.5 C and the charging at 0.3 C. The obtained results are shown in FIGS. 5 to 8.

As shown in FIGS. 5 to 8, it can be seen that the discharging amounts of the batteries according to Examples are superior to those of Comparative Examples. Specifically, it can be seen that in the case of using the separator containing the coating layer according to the present invention, the polysulfide leached from the positive electrode is adsorbed on the surface of the separator of Examples and reused, so that not only the values of the discharge capacity are higher than those of Comparative Examples, but also the capacity retention ratios are also excellent and the lifetime characteristics are further improved. In particular, referring to FIG. 8, it can be confirmed that when a coating layer is formed using a dendrimer-type polymer, the discharging capacity at a high rate is rapidly reduced, thereby shortening the lifetime and being degraded in early stages Experimental Example 3

Scanning Electron Microscopic Analysis

The separator prepared in Example 1, Example 2 and Comparative Example 5 was observed using a Scanning Electron Microscope (SEM) (Model: S-4800, HITACHI) before battery operation. The results obtained at this time are shown in FIGS. 9 to 11.

Figure 9:
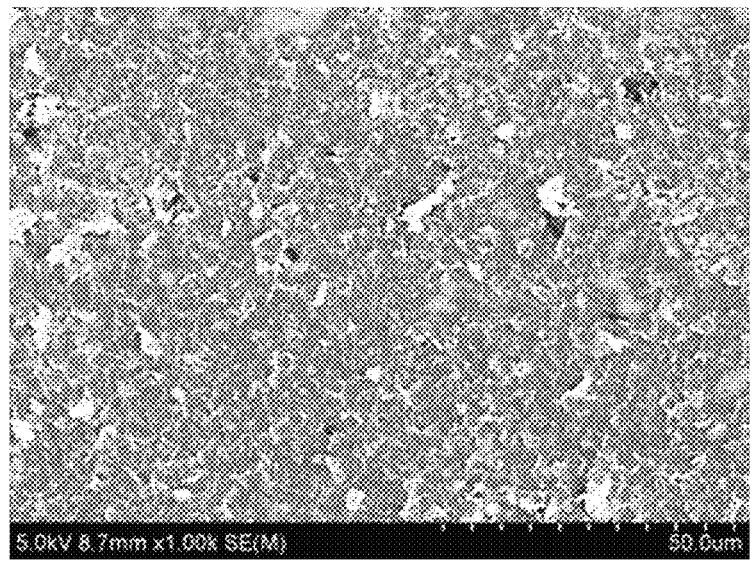
FIG. 9 is a scanning electron microscope image of the separator prepared in Example 1 of the present invention.
Figure 10:
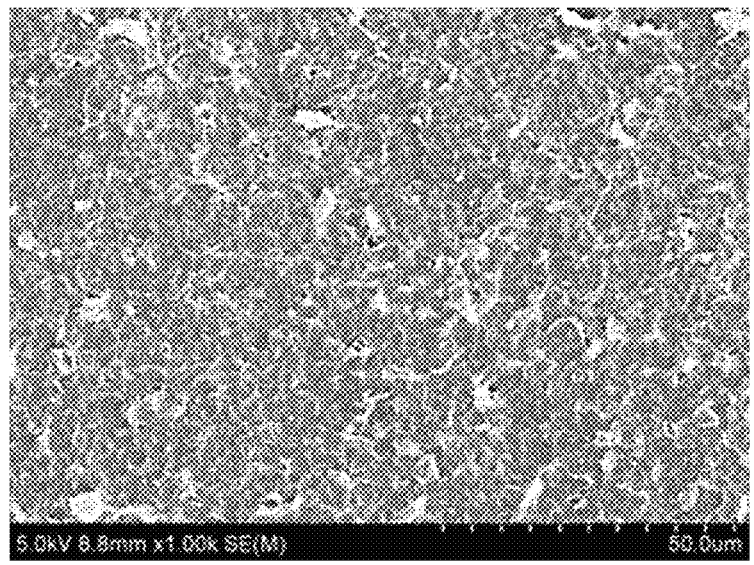
FIG. 10 is a scanning electron microscope image of the separator prepared in Example 2 of the present invention.
Figure 11:
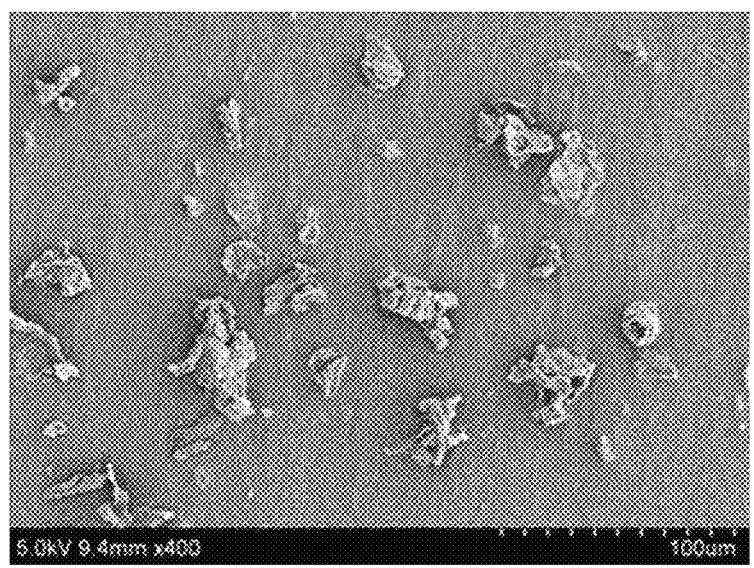
FIG. 11 is a scanning electron microscope image of the separator prepared in Comparative Example 6 of the present invention.

Referring to FIGS. 9 to 11, it is confirmed that in the case of the separator of Examples 1 and 2, the coating layer is formed uniformly and densely on the substrate. In comparison with this, referring to FIG. 11, it can be seen that the reduced graphene oxide not subjected to the peeling treatment is aggregated on the separator.

The invention claimed is:

1. A separator for a lithium-sulfur battery comprising:
a porous substrate; and
a coating layer present on at least one surface of the porous substrate,
wherein the coating layer is formed from a composition comprising:
(a) a polymer comprising (i) a main chain, wherein a functional group comprising a non-covalent electron pair is present in the main chain, and (ii) a side chain, wherein an aromatic hydrocarbon group is present in the side chain, and
(b) a graphitic carbon-based compound,
wherein the polymer excludes a dendrimer structure.

2. The separator for the lithium-sulfur battery according to claim 1, wherein the functional group comprising the non-covalent electron pair comprises at least one selected from the group consisting of an amine group, an ether group, an ester group, a carbonate group, a carbonyl group, an imide group, and an amide group.

3. The separator for the lithium-sulfur battery according to claim 1, wherein the aromatic hydrocarbon group comprises at least one selected from the group consisting of a phenyl group, a biphenyl group, a naphthyl group, a fluorenyl group, an anthracenyl group, and a perylenyl group.

4. The separator for the lithium-sulfur battery according to claim 1, wherein the polymer is represented by the following Chemical Formula 1:

[Chemical Formula 1]

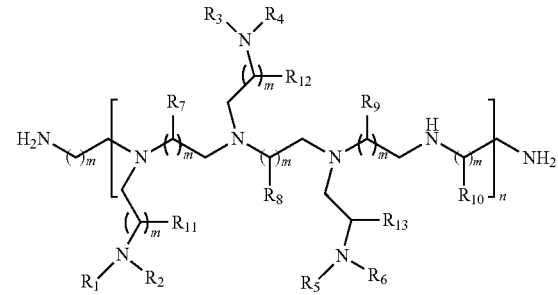

wherein $R_1$ to $R_6$ are the same as or different from each other, and are each independently selected from the group consisting of hydrogen; a substituted or unsubstituted C1-C20 alkyl group; $(R_{14}R_{15})$amino(C2-C10) alkyl group; a substituted or unsubstituted C3-C20 cycloalkyl group; a substituted or unsubstituted C6-C20 aryl group; and a substituted or unsubstituted C4-C20 heteroaryl group; or $R_1$ and $R_2$, $R_3$ and $R_4$ and $R_5$ and $R_6$, together with an amide bond or an imide bond including nitrogen, each independently form a 5 to 50-membered ring including a substituted or unsubstituted C6-C20 aryl group or a substituted or unsubstituted C4-C20 heteroaryl group;

$R_{14}$ and $R_{15}$ are the same as or different from each other, and are each independently selected from the group consisting of hydrogen; a substituted or unsubstituted C1-C20 alkyl group; a substituted or unsubstituted C3-C20 cycloalkyl group; a substituted or unsubstituted C6-C20 aryl group; and a substituted or unsubstituted C4-C20 heteroaryl group; or $R_{14}$ and $R_{15}$ together with an amide bond or an imide bond including nitrogen, form a 5 to 50-membered ring including a substituted or unsubstituted C6-C20 aryl group or a substituted or unsubstituted C4-C20 heteroaryl group;

$R_1$ and $R_2$, $R_3$ and $R_4$, $R_5$ and $R_6$ and $R_{14}$ and $R_{15}$ are optionally be bonded to each other to form an aliphatic or aromatic ring including a heteroatom;

at least one of $R_1$ to $R_6$ comprises an aromatic ring, or is connected to another substituent of adjacent $R_1$ to $R_6$ through an aromatic ring;

$R_7$ to $R_{13}$ are the same as or different from each other, and are each independently selected from the group consisting of hydrogen, oxygen, and a substituted or unsubstituted C1-C10 alkyl group, and when $R_7$ to $R_{13}$ are oxygen, then the $R_7$ to $R_{13}$ group forms a double bond with the bonded carbon atom;

m is each independently an integer of 0 to 5; and n is an integer from 5 to 5,000.

5. The separator for the lithium-sulfur battery according to claim 4, wherein $R_1$ to $R_6$ are the same as or different from each other, and are each independently selected from the group consisting of hydrogen and $(R_{14}R_{15})$amino(C2-C5) alkyl group; or $R_1$ and $R_2$, $R_3$ and $R_4$, and $R_5$ and $R_6$, together with an amide bond or an imide bond including nitrogen, each independently form a 5 to 50-membered ring including a substituted or unsubstituted C6-C20 aryl group or a substituted or unsubstituted C4-C20 heteroaryl group;

$R_{14}$ and $R_{15}$ are the same as or different from each other, and are each independently selected from the group consisting of hydrogen; and a substituted or unsubstituted C4-C20 heteroaryl group; or $R_{14}$ and $R_{15}$ together with an amide bond or an imide bond including nitrogen, form a 5 to 50-membered ring including a substituted or unsubstituted C6-C20 aryl group or a substituted or unsubstituted C4-C20 heteroaryl group;

$R_7$ to $R_{13}$ are hydrogen;

m is an integer of 1 to 3; and n is an integer of 5 to 5,000.

6. The separator for the lithium-sulfur battery according to claim 1, wherein the polymer has a number average molecular weight of from 200 to 200,000.

7. The separator for the lithium-sulfur battery according to claim 1, wherein the polymer has a polydispersity index of from 1.05 to 20.

8. The separator for the lithium-sulfur battery according to claim 1, wherein the polymer is a branched polymer.

9. The separator for the lithium-sulfur battery according to claim 1, wherein the graphitic carbon-based compound comprises at least one selected from the group consisting of graphene oxide, reduced graphene oxide, thermal expansion-reduced graphene oxide, and graphite oxide.

10. The separator for the lithium-sulfur battery according to claim 1, wherein the graphitic carbon-based compound has a thickness of from 0.5 nm to 40 nm.

11. The separator for the lithium-sulfur battery according to claim 1, wherein the graphitic carbon-based has a plate shape or a flake shape.

12. The separator for the lithium-sulfur battery according to claim 1, wherein a weight ratio of the polymer and the graphitic carbon-based compound in the coating layer is from 1:10 to 10:1.

13. The separator for the lithium-sulfur battery according to claim 1, wherein the coating layer has a thickness of from 0.1 μm to 50 μm.

14. A lithium-sulfur battery comprising a positive electrode; a negative electrode; a separator and an electrolyte interposed between the positive electrode and the negative electrode, wherein the separator comprises the separator according to claim 1.

* * * * *